Figure 1:
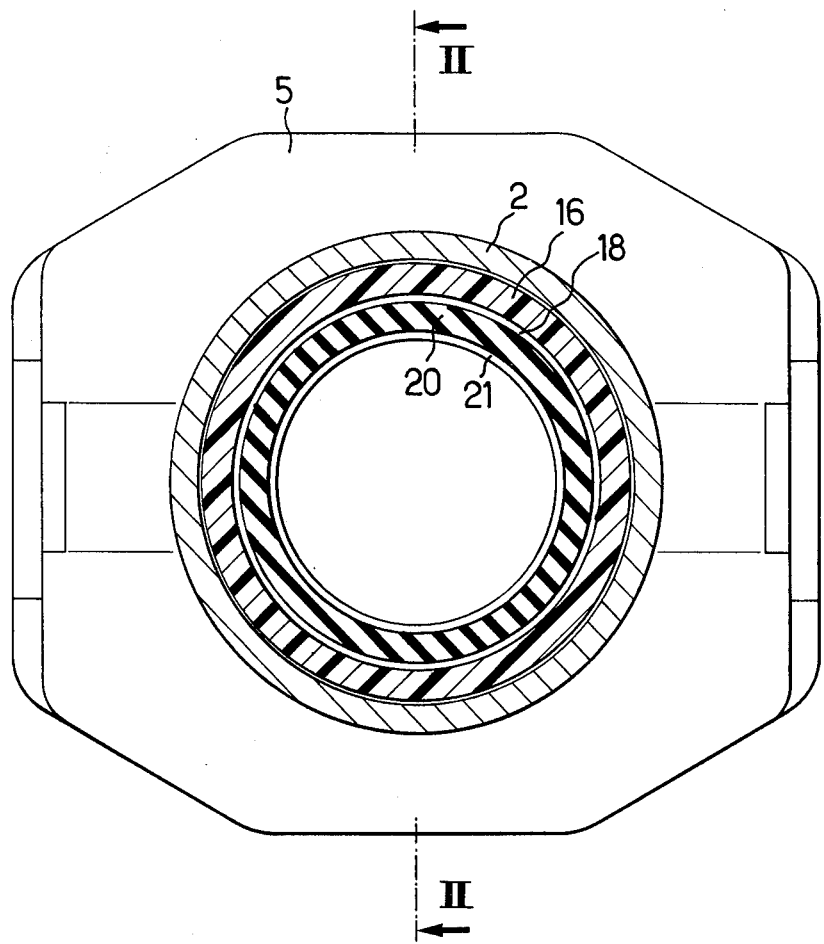

United States Patent [19]

Flaissier et al.

[11] 4,080,019
[45] Mar. 21, 1978

[54] SELF-CENTERING CLUTCH RELEASE BEARING

[75] Inventors: Thierry Flaissier; Francis Regazzoni, both of Paris; Max Risso, Neuilly-sur-Seine; Claude Serville, Clamart, all of France

[73] Assignee: SKF Compagnie d'Applications Mecaniques, Clamart, France

[21] Appl. No.: 707,286

[22] Filed: Jul. 21, 1976

[30] Foreign Application Priority Data

Aug. 5, 1975 France .................................. 75 24389

[51] Int. Cl.² ............................................ F16D 23/14
[52] U.S. Cl. ....................................... 308/235; 192/98
[58] Field of Search ......................... 308/233, 235, 72; 192/45, 98

[56] References Cited

U.S. PATENT DOCUMENTS

| 3,361,503 | 1/1968 | Grby | 308/233 |
| 3,631,954 | 1/1972 | Coaley | 192/98 |
| 3,788,437 | 1/1974 | Camp | 192/98 |

Primary Examiner—Joseph F. Peters, Jr.
Assistant Examiner—Gene A. Church
Attorney, Agent, or Firm—Owen, Wickersham & Erickson

[57] ABSTRACT

A self-centering clutch release bearing, having means for enabling its axial sliding on a tube guide, enabling substantial radial movement of the clutch release bearing, and insuring axial pressure so that the clutch release bearing remains entered after radial movement. A ring slides directly on the tube guide, and a sleeve fits inside the bearing's inner race. The ring fits in the sleeve and radial end surfaces of the ring engage end surfaces of the sleeve. Either the sleeve or the ring has a groove whose axial ends engage radial walls of the other.

19 Claims, 15 Drawing Figures

SELF-CENTERING CLUTCH RELEASE BEARING

The present invention relates to a self-centering clutch release bearing for disc clutches and particularly for diaphragm clutches, wherein the release bearing comprises an anti-friction bearing, for example a ball bearing, or needle bearing or roller bearing, and means for axial sliding on a stationary tube guide, inside which the shaft of the gear box rotates, the structure enabling substantially radial movement of the release bearing unit so as to bring into correctly centered position in relation to the diaphragm, this position being maintained after the clutch disengagement operation.

It is known that clutch release bearings which comprise a ball bearing or the like should, preferably, be provided with resilient means enabling a certain movement of the release bearing in relation to the shaft of the gear box of the vehicle or in relation to the tube guide on which the release bearing moves. It is known, in fact, that one of the two races of the ball bearing of such a release bearing transmits the clutch disengagement stress and comes into direct supporting contact with the diaphragm or remains in continuous contact with it, while the other race receives the thrust of the clutch disengagement fork. The race coming into contact or remaining in contact with the diaphragm, for example the inner race of the bearing, has a generally toric supporting surface, the release bearing not being centered exactly on the shaft of the speed box. Further, the geometric axis of the diaphragm of the clutch release, its axis of rotation, and the axis of the shaft of the speed box or of the tube guide do not always coincide exactly, thus making it still more necessary to provide for the possibility of moving the release bearing in relation to the tube guide.

To cure this disadvantage, it has previously been proposed to cover with an anti-friction material either the race in contact with the diaphragm, or the diaphragm itself, proper, or the two members in contact with each other, so as to reduce friction and wear and tear of the members in relation to each other during each clutch disengagement operation.

It has also been proposed to provide clutch release bearings with means for achieving automatic alignment during each clutch release operation. In release bearings of this type, resilient elements of varying form may be interposed between one of the races of the ball bearing and the tube guide, or between one race and a sliding socket moving in relation to the tube guide or in relation to the shaft of the gear box. Thus automatic alignment of the release bearing is obtained at each clutch disengagement operation. The interposed resilient elements permit radial movement and pivoting of the release bearing under the action of the reaction force of the support of the release bearing on the clutch engagement diaphragm. After each clutch disengagement, the resilient elements return into their initial condition, the release bearing thus resuming its off-center position.

In accordance with French Pat. No. 1,467,848, a clutch release bearing has also been provided which can center itself automatically during a clutch release operation and can remain in such centered position after the clutch disengagement. This type of clutch release bearing comprises a ball bearing with massive races capable of moving radially in relation to a sliding socket mounted on the tube guide. One of the races is in frictional contact with a washer or flange against which it is urged axially by a spring device.

In relation to the previously described embodiment, this latter embodiment has the advantage that the release bearing remains in centered position after the clutch disengagement operation. However, the structure of this clutch release bearing is complicated and expensive, taking into account the large number of components and their particular disposition, which does not permit the use of a ball bearing of the same type for different embodiments of clutch release bearings without modifying the axial and radial dimensions of the other parts.

An object of the present invention is to overcome these disadvantages and to provide a clutch release bearing that insures automatic centering which is maintained after the clutch disengagement operation, the invention accomplishing this in a simple manner and with a structure which is easy to manufacture.

Another object of the present invention is to provide a self-centering clutch release bearing comprising a thin-walled ball bearing in which the self-centering means is disposed inside the inner race in such a manner as to enable the use of the same type of bearing for different clutch release bearings.

A self-centering clutch release bearing in accordance with the invention comprises an anti-friction bearing, for example a ball bearing, roller bearing, needle bearing, or the like, and means enabling the axial sliding of that bearing on a tube guide. It also comprises means for providing substantially radial movement of the bearing and for insuring axial pressure, in order that the release bearing remain centered after such movement. In accordance with the invention, the clutch release bearing comprises a sleeve secured by any appropriate means, such as a detent or ratchet structure or by molding the sleeve to the inside of the inner race. The sleeve has at least two radial annular surfaces which, while being subjected to axial pressure, are in frictional contact with two corresponding surfaces of a ring which slides directly on the tube guide without interposition of an intermediate member, such as a socket or the like.

In a first embodiment, the radial annular surfaces of the sleeve define at least one annular groove inside which is located, partially enclosed, the ring that slides directly on the tube guide. In accordance with various modifications of this embodiment, particular configurations of the sliding ring may be contemplated, so as to enhance its deformation, thereby improving the action of the desired axial pressure on the radial annular surfaces in contact. Other modifications enable economies in material by a judicious change in the structure of the ring.

In a second embodiment of the clutch release bearing in accordance with the invention, the radial annular surfaces of the sleeve are defined by a plurality of cavities provided in the sleeve and cooperating with as many bosses of the ring. In accordance with a preferred embodiment, said cavities may extend the full length of the sleeve from end to end.

In accordance with a third embodiment of the clutch release bearing of the invention, the radial surfaces of the ring sliding on the tube guide are defined by a plurality of cavities provided in the ring and cooperating with as many bosses of the sleeve. Here too, said cavities may extend from end to end along the ring inside which they are provided.

In accordance with a fourth embodiment of the clutch release bearing of the present invention, the radial annular surfaces of the sleeve define at least one annular rib which is partially enclosed in a corresponding groove provided on the outer surface of the ring that slides directly on the tube guide.

In these various embodiments, one of the members in frictional contact, that is the sleeve or the ring, is made of a relatively resilient material, while the other is of a relatively rigid plastic material, such as a thermoplastic material or a thermosetting material. Resilient materials producing good results are, for example, elastomeric materials and synthetic rubbers. A resilient axial pressure is thus obtained, the material working either under compression or under tension, depending on the embodiment.

Figure 2:
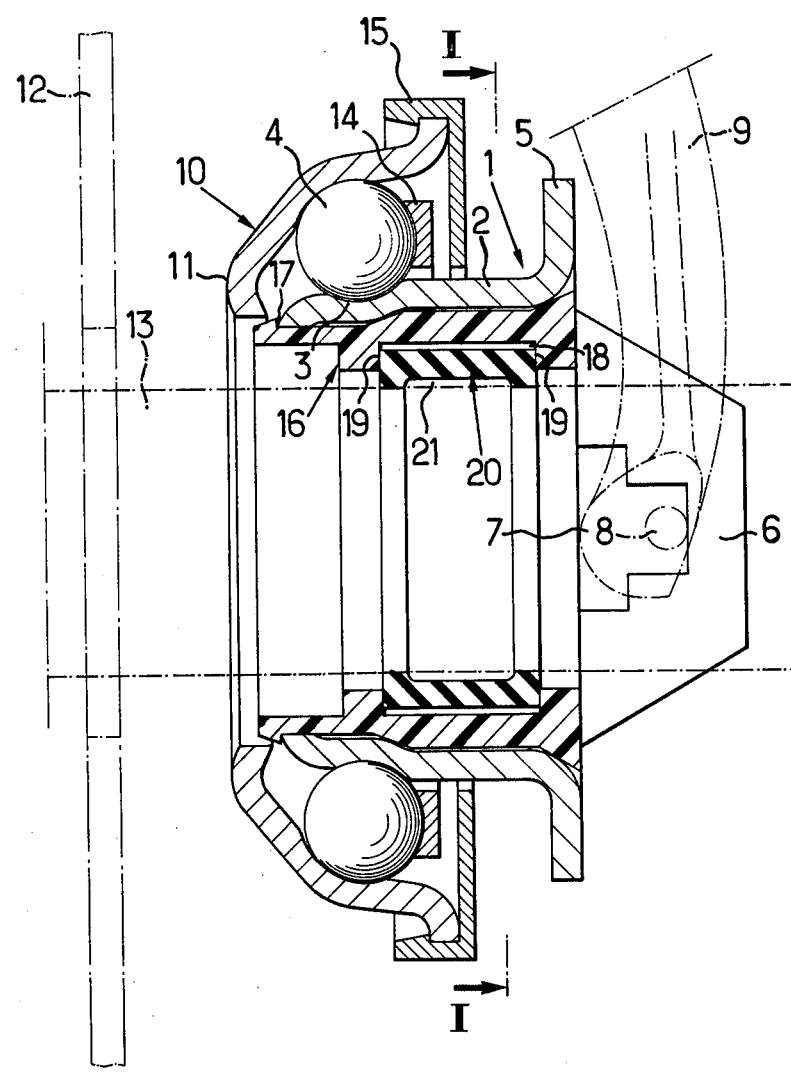
Figure 7:
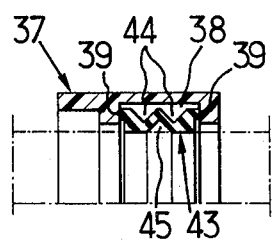
Figure 8:
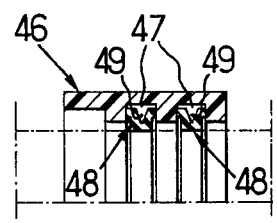
Figure 9:
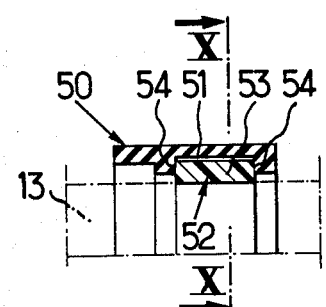
Figure 10:
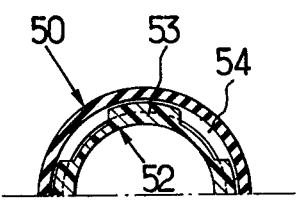
Figure 11:
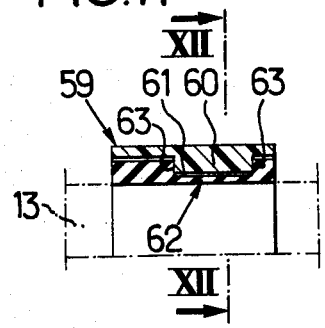
Figure 12:
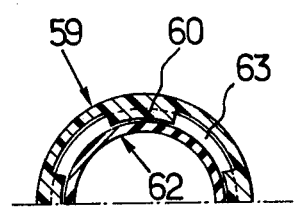
Figure 13:
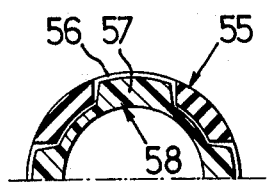
Figure 14:
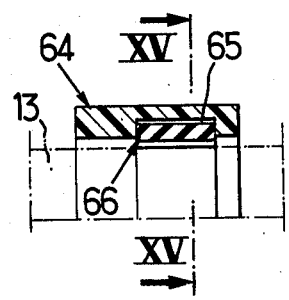
Figure 15:
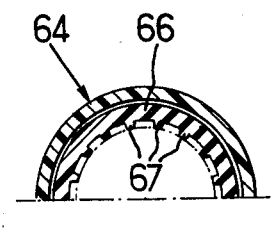

The invention will be more clearly understood after study of a certain number of particular embodiments described by way of non-limiting examples and the attached drawings, in which:

FIG. 1 is a front view of a self-centering clutch release bearing in accordance with the invention along the line I—I of FIG. 2, FIG. 2 is a sectional view along the line II—II of FIG. 1, FIGS. 3 to 9 are schematic elevational views partially in section showing the self-centering means according to the various modifications of the invention, FIG. 10 is a partial section along the line X—X of FIG. 9, FIG. 11 is a schematic elevational view in partial section showing self-centering means according to another modification of the invention, FIG. 12 is a view in partial section along the line XII—XII of FIG. 11, FIG. 13 is a partial section analogous to that of FIG. 10 illustrating another modification of the invention, FIG. 14 is a schematic elevational view partially in section showing another modification of the self-centering means in accordance with the invention, and FIG. 15 is a partial section along the line XV—XV of FIG. 14.

As represented in FIGS. 1 and 2, a clutch release bearing in accordance with the invention may comprise an inner thin-walled race 1 stamped from a metal sheet or tube, having a tubular portion 2 and a toric raceway 3 for a row of balls 4.

In this embodiment, the tubular portion 2 is prolonged outwardly by a radial flange 5, which is, in turn, laterally prolonged by two lugs 6 parallel to the axis of the release bearing. Each lug 6 has a recess 7 cooperating with a locking pin 8 of a clutch control fork 9, these elements being shown in broken lines in FIG. 2. It will be understood that other means for securing the fork may be contemplated.

The ball bearing of the illustrated clutch release bearing is completed by an outer race 10, also having thin walls, stamped from a metal sheet or tube. The outer race 10 has a toric portion 11 which may come into contact with the surface of a diaphragm 12 or of an analogous element, shown in broken lines in FIG. 2, when the fork 9 has caused longitudinal movement of the release bearing in relation to a tube guide 13, shown in broken lines in FIG. 2 and inside which the shaft of the gear box revolves. The balls 4 are held by a cage 14, and the bearing is protected by a cover 15.

In accordance with the invention, a sleeve 16 is secured by any appropriate means to the inside of the inner race 1 covering the entire inner surface. The sleeve 16 may, for example, be secured by staking or spinning or, as shown in FIG. 2, by forming an annular flange 17 near one end cooperating with the rim of the inner race 1. As may be seen in FIG. 2, the outer surface of the sleeve 16 has a shape adapted to conform approximately to that of the inner race 1. It will be well understood that the sleeve 16 may be secured by other means; for example, it may be molded onto the inner race 1.

As may be seen in FIG. 2, the sleeve 16 has on its inner surface an annular groove 18, which is defined by two radial annular surfaces 19, one at each end of the groove 18.

A ring 20 surrounds the tube guide 13 and comes into direct contact with it. This ring 20 is partially enclosed inside the annular groove 18 of the sleeve 16. The planar end surfaces of the ring 20 are located in a radial plane and delimit the ring 20, and they are, as may be seen in FIG. 2, in frictional contact with the radial annular surfaces 19 which delimit the groove 18 of the sleeve 16. The outer diameter of the ring 20 is less than the inner diameter of the annular groove 18, so that the sleeve 16 and the clutch release bearing in its entirety may move substantially in a radial plane in relation to the ring 20, which is in contact with the tube guide 13.

In the embodiment shown in FIGS. 1 and 2, the ring 20 further has an annular recess 21 on its inner surface for retaining a reserve of lubricant. It will be well understood that this is an optional constructional detail.

In the same way, it is seen in the example illustrated in FIGS. 1 and 2 that the sleeve 16 may be made of a synthetic plastic material which preferably has a certain rigidity, while the ring 20 may be made of a relatively resilient material, such as an elastomer or rubber, usually a synthetic rubber. In this way, axial pressure may be easily obtained by an appropriate choice of the relative dimensions of the ring 20 and the annular groove 18 of the sleeve 16. In this embodiment, the relatively resilient ring 20 is thus compressed inside the annular groove 18.

During the clutch disengagement operation controlled by the clutch pedal of the vehicle, the fork 9 causes a thrust on the inner race 1 of the ball bearing of the clutch release bearing of the invention. The race 1 thus slides relatively to the tube guide 13, such sliding occurring through the intermediary action of the ring 20, whose inner surface is in frictional contact with the outer surface of the tube guide 13. When the stress is transmitted by the toric portion 11 of the outer race 10 in contact with the diaphragm 12, the ball bearing integral with the sleeve 16 moves substantially in a radial plane in relation to the ring 20, thereby insuring automatic centering of the clutch release bearing. When the action on the clutch pedal ceases, the release bearing in accordance with the invention remains in centered position, thanks to the resilient compression action in the axial direction, which is exerted at the level of the contacting radial annular surfaces of the sleeve 16 and the ring 20.

It will be well understood that it is entirely possible to interchange the materials of which the various elements are made and which insure self-centering of the clutch release bearing. Thus, it is possible to make the ring of a relatively rigid thermoplastic or thermosetting material and the sleeve 16 of a relatively resilient material such as an elastomer or rubber. In this case, the ring 20 enclosed in the annular groove 18 of the sleeve 16 will tend to cause deformation of the latter, whose material is then placed in tension.

In the embodiment illustrated in FIGS. 1 and 2, the sleeve 16 and the ring 20 are each made of one single piece, the ring 20 being mounted in the groove 18 of the sleeve 16 by deformation of the ring 20. In the event that such mounting should prove difficult, due to low resilience in a particular ring 20, it will be understood that a straight slit or a bevel may be provided on the ring 20 so as to enable its deformation during installation.

In the same way and depending on the rigidity of the material used for the sleeve 16, it may be slit or even made of two half-pieces thus permitting easy mounting inside the inner race 1 of the bearing.

Figure 3:
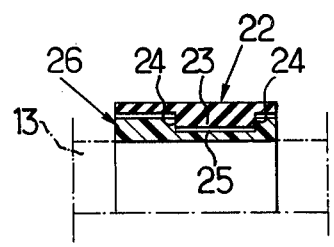
Figure 4:
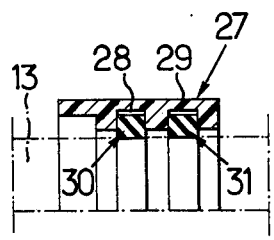
Figure 5:
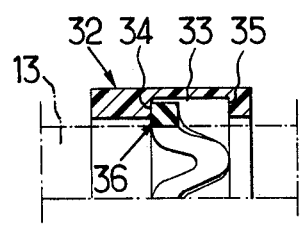

FIGS. 3 to 5 represent illustrations which are much more schematic than the preceding figures. They show various modifications of structure of the sleeve and the ring, which constitute the self-centering elements interposed in accordance with the invention between the inner race of the bearing and the tube guide. For simplicity's sake, only the upper half of these elements has been represented, and the shape has been stylized to retain only its essential characteristics. It will, however, be understood that in reality the general shape of these elements will usually be somewhat different, the configuration of the sleeve being, in particular, adapted to the inner surface of the inner race of the bearing so as to permit its attachment thereto, for example by molding or by mechanical firming. In the same way, the elements may have configurations permitting easier mounting by deformation.

FIG. 3 shows in partial section in elevation a sleeve 22 having on its inner surface an annular cylindrical portion 23 of reduced diameter, defined by two planar radial end surfaces 24. The annular portion 23 is partially enclosed in an annular groove 25 provided on the outer surface of a ring 26, which slides directly on the tube guide 13. As before, the sleeve 22 is secured inside the inner race of a bearing and can move substantially in a radial plane in relation to the ring 26, taking into account the play that exists between the rib 23 and the groove 25. In this illustrated embodiment, the sleeve 22 is made of a relatively resilient material, such as a rubber or an elastomer, while the ring 26 is made of a relatively rigid plastic material.

The embodiment of FIG. 4 is a structural modification connected with the embodiment of FIGS. 1 and 2. As will be seen in FIG. 4, the sleeve 27 here has two annular grooves 28 and 29, each of which encloses a ring 30, 31. Each of the rings 30 and 31 may slide directly on the tube guide 13 and, as before, automatic centering of the release bearing is obtained by movement substantially in a radial plane of the sleeve 27. The sleeve 27 is made of relatively rigid plastic material in relative to the two rings 30 and 31, which are made of a resilient material such as an elastomer. In this embodiment, the radial annular surfaces in frictional contact thus are four in number. Further, the space between the two rings 30 and 31 defines a reservoir for a lubricant.

FIG. 5 illustrates an embodiment which enables economies of material for the ring. In this embodiment, a sleeve 32 is made of a relatively rigid plastic material and has an annular groove defined by two radial annular surfaces 34 and 35. The ring 36, which is of substantially rectangular cross-section, is shaped, providing corrugations in the axial direction, which come into contact with two confining surfaces of the groove 33, now with the annular planar radial surface 34, now with the annular planar radial surface 35. The radially inner axially extending surface of the ring 36 remains in contact with the cylindrical outer surface of the tube guide 13, along which it can slide directly. In this embodiment, the ring 36 is made of a relative resilient material such as a rubber or an elastomer and may thus exert resilient pressure by flexing toward the corresponding annular surfaces 34 and 35 of the sleeve 32.

Figure 6:
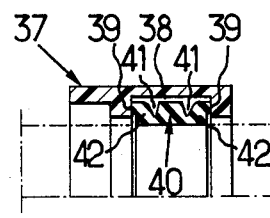

FIGS. 6, 7, and 8 illustrate modifications in which the ring has a configuration which favors its deformation, thus insuring better axial pressure on the annular surfaces of the sleeve. In these embodiments, the ring is generally made of a relative resilient material.

In FIGS. 6 and 7, a sleeve 37 made of a relatively rigid plastic material comprises an annular groove 38 which is delimited by two radial surfaces 39. In the modification shown in FIG. 6, a ring 40 has on its outer surface two annular grooves 41 which do not interfere with the two annular planar surfaces 42 at each end, these surfaces 42 being in frictional contact with the radial surfaces 39 of the sleeve 37. These annular portions 42 can become deformed easily by the flexure of the ring 40 at the grooves 41, thus improving the axial pressure effect on the two sets of radial annular surfaces which are in contact with each other.

In the embodiment of FIG. 7, a ring 43 comprises two annular V-shaped grooves 44 on its outer surface and an annular V-shaped groove 45 on its inner surface, so as to produce a central portion in the form of a bellows, which has the characteristics of a spring working at compression. The annular groove 45 also plays the role of a reservoir for lubricant. Due to the particular structure of the ring 43, the effect of the desired axial pressure when the radial annular surfaces are in contact is improved.

The embodiment of FIG. 8 profits from the teachings of the modifications shown in FIGS. 4 and 6, respectively. In this embodiment, in effect, a sleeve 46 has two annular grooves 47, and each of two rings 48 has a V-shaped groove 49 on its outer surface so as to favor its deformation by bending in the same way as in the modification of FIG. 6.

The embodiments shown in FIGS. 9 to 13 permit economizing on the material of the sleeve and/or of the ring. In the modification illustrated in FIGS. 9 and 10, a sleeve 50 made, for example, of synthetic rubber, has an annular groove 51, while a ring 52 of relatively rigid plastic material comprises a plurality of bosses or splines 53 which extend out into the annular groove 51, with their radial end surfaces in frictional contact with certain localized portions of the radial annular surfaces 54 which define the annular groove 51 of the sleeve 50.

FIG. 13 is a modification of the embodiment illustrated in FIG. 10 in which a sleeve 55, made for example of an elastomer, has a plurality of cavities 56, into which an equal number of bosses or splines 57 extend, the splines 57 being integral with the ring 58, which is made of a plastic material, the splines 57 being similar to the bosses or splines 53 of the ring 52, frictional contact being established in the same way along the radial end surfaces of the bosses 57. In the illustrated modification, the cavities 56 extend completely through the sleeve 55. It is well understood that the cavities may stop short of the sleeve's exterior surface. It will be easily understood that in the embodiment illustrated in FIG. 13 it is possible to economize not only on the material of the ring 58 by providing it with a reduced number of bosses, but also on the material of the sleeve 55 by providing it with the cavities 56, all without disturbing the functioning of the clutch release bearing in accordance with the invention. In another modification, not shown, which is an inversion of the embodiment of FIG. 13, the ring may have the cavities and the sleeve the splines. There also, the cavities may preferably extend all the way through the ring.

FIGS. 11 and 12 illustrate an embodiment which is an inversion of the modification shown in FIGS. 9 and 10. As may be seen in FIGS. 11 and 12, a sleeve 59 of a relative rigid plastic material has a plurality of bosses or splines 60 which are partially enclosed in an annular groove 61 on the outer surface of a ring 62. The radial end surface of the bosses 60 are in contact with certain localized portions of the corresponding radial annular surfaces 63 of the annular groove 61 of the ring 62, which are made, for example, of an elastomer.

FIGS. 14 and 15 illustrate a modification of the embodiment analogous in its principle to that of FIGS. 1 and 2. A sleeve 64 of plastic material has an inner annular groove 65 enclosing a ring 66 of rubber which partially fills it. In order to prevent the lubricant placed on the outside surface of the tube guide 13 from becoming eliminated by the successive sliding of the clutch release bearing in relation to the tube guide, the inner surface of the ring 66, the one in contact with the outer surface of the tube guide 13, has a plurality of radially inwardly extending circumferential ribs 67 which extend in an axial direction over the entire length of the ring. Apart from this structural modification, the structure of the various elements is analogous to that of the embodiment of FIGS. 1 and 2, and the functioning is the same. It is well understood that this structural improvement may be applied to all the modifications described hereinabove.

Although a certain number of possible embodiments has been represented, it will be understood that other modifications may be contemplated without exceeding the scope of the present invention. Thus, the structure of the various elements providing self-centering may be adapted so as to facilitate their mounting, for example by using slit rings or sleeves of two half-pieces. In the same way, those skilled in the art will themselves easily decide what materials to use for the various constituent parts of the clutch release bearing in accordance with the invention, to the extent that the cooperation of these parts enables obtaining the desired axial pressure that help to maintain the release bearing in its centered position.

With the present invention a clutch release bearing is obtained which is inexpensive, taking into account the use of a ball bearing comprising thin-walled inner and outer races and the elimination of any intermediary sliding socket. Further, the particular structure of the elements enabling self-centering causes the release bearing in accordance with the invention to function with a considerable reduction of wear and tear of the members in contact.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A self-centering clutch release bearing comprising:
   an anti-friction bearing with rolling parts and an inner race having an interior surface,
   a guide tube, and
   intermediary means for enabling axial sliding of said bearing on said guide tube, said intermediary means comprising two members, namely
   a sleeve secured to said interior surface of said inner race and
   at least one ring sliding directly on the guide tube,
   one said member having at least one recessed portion with two spaced-apart radial annular lateral surfaces,
   the other said member having radial annular lateral surfaces in contact with said radial lateral surfaces of said recessed portion, said other said member being only partially enclosed in said recessed portion, with freedom for any portion of said other said member to move further into said recessed portion,
   the relative dimensions of said members being such that an axial pressure is exerted between the contacting radial lateral surfaces of the members,
   one said member being made of a relatively rigid plastic material while the other said member is made of relatively resilient elastomer,
   whereby the release bearing may be subjected to a radial centering movement relative to said ring and then remains centered after such movement.

2. A release bearing in accordance with claim 1 wherein said ring has on its outer surface at least one annular groove favoring deformation of said ring and thereby improving the desired axial pressure on the radial surfaces in contact with each other.

3. A release bearing in accordance with claim 1 wherein said sleeve is made from relatively rigid plastic material while said ring is made from relatively resilient elastomer.

4. A release bearing in accordance with claim 1 wherein said sleeve is made from relatively resilient elastomer while said ring is made from relatively rigid plastic material.

5. A release bearing in accordance with claim 1 wherein said ring has on its inner surface, in contact with said tube guide, an annular groove serving as a lubricant reservoir.

6. A release bearing in accordance with claim 1 wherein said ring has on its inner surface, in contact with said guide tube, a plurality of circumferentially disposed radially inwardly-extending ribs which extend axially for the full length of said ring.

7. A release bearing in accordance with claim 1 wherein either said sleeve or said ring is slit to facilitate mounting.

8. A release bearing in accordance with claim 1 wherein said sleeve is made of two half-pieces to facilitate mounting.

9. A release bearing in accordance with claim 1 wherein the inner race of the bearing has a tubular portion terminating in a planar supporting flange for a clutch fork, said flange in turn terminating in two lugs, each comprising a recess for cooperating with locking means axially uniting the unit with the fork.

10. A self-centering clutch release bearing comprising:
   an anti-friction bearing with rolling parts and an inner race having an interior surface,
   a guide tube, and intermediary means between said bearing and said guide tube, said intermediary means comprising two portions, one said portion being a sleeve secured to said interior surface of said inner race for enabling axial sliding of said bearing on said guide tube and having an annular groove defined by two spaced-apart radial annular lateral surfaces, and a cylindrical surface, the other said portion comprising at least one ring sliding directly on the guide tube and having radial lateral surfaces in contact with said radial lateral surfaces of said annular groove, said ring element having a cylindrical surface spaced from the cylindrical surface of said annular groove, one said portion being made of a relatively rigid plastic material while another said portion is made of relatively resilient elastomer, the relative dimensions of said ring element and said annular groove being such that an axial pressure is exerted between the radial lateral surfaces of said ring element and the radial lateral surfaces of said annular groove, whereby the release bearing may be subjected to a radial centering movement relative to said ring element and then remain centered after such movement.

11. A release bearing according to claim 10 wherein said ring element comprises a plurality of bosses partially enclosed in said annular groove of said sleeve.

12. A release bearing in accordance with claim 10 wherein said ring element is axially corrugated, successive corrugations coming in contact respectively with each of the two radial annular surfaces of the groove of the sleeve.

13. A release bearing in accordance with claim 10 wherein there is a plurality of said rings, and a corresponding plurality of annular groove portions in said sleeve, said ring each cooperating with a said annular groove.

14. A self-centering clutch release bearing comprising:

an anti-friction bearing with rolling parts and an inner race having an interior surface, a guide tube, and intermediary means between said bearing and said guide tube, comprising two portions, one said portion being a sleeve secured to said interior surface of said inner race for enabling axial sliding of said bearing on said guide tube and having a plurality of annular groove segments, each having spaced-apart radial annular lateral surfaces, the other said portion being at least one ring sliding directly on the guide tube and having radial lateral surfaces in contact with said radial lateral surfaces of said annular groove segments, said ring being only partially enclosed in said annular groove segments and any portion of said ring being enabled to move radially with respect to said segments, one said portion being made of a relatively rigid plastic material while another said portion is made of relatively resilient elastomer, the relative dimensions of said ring element and said annular groove segments being such that an axial pressure is exerted between the radial lateral surfaces of said ring element and said radial lateral surfaces of said annular groove segments, whereby the release bearing may be subjected to a radial centering movement relative to said ring element and then remain centered after such movement.

15. A release bearing in accordance with claim 14 wherein said groove segments and said radial annular surfaces of said sleeve are defined by a plurality of cavities located circumferentially, each leading out radially from the inner surface of said sleeve, said ring having a corresponding number of bosses disposed circumferentially thereabout and cooperating with said cavities.

16. A release bearing in accordance with claim 15 wherein said cavities of said sleeve extend all the way therethrough.

17. A self-centering clutch release bearing comprising an anti-friction bearing with rolling parts and an inner race, a guide tube, and intermediary means between said bearing and said guide tube and comprising two portions, one said portion being a sleeve secured to the interior surface of the inner race of the bearing and having at least two spaced-apart radial annular surfaces defining at least one annular radially inwardly extending portion with radial lateral surfaces, the other said portion comprising at least one ring sliding directly on the guide-tube and having on its outer surface at least one circumferentially extending groove with lateral surfaces comprising radial flat portions in contact with said radial lateral surfaces of said annular radially inwardly extending portion, said groove of said ring only partially enclosing said annular radially inwardly extending portion so that relative movement of said sleeve and said groove is enabled for centering, one said portion being made of a relatively rigid plastic material while another portion is made of relatively resilient elastomer material, the relative dimensions of said groove and said annular radially inwardly extending portion being such that an axial pressure is exerted between the radial lateral contacting surfaces of said groove and said annular radially inwardly extending portion, whereby the release bearing may be subjected to a radial centering movement relative to said ring element and remains eentered after such movement.

18. A release bearing in accordance with claim 17 wherein said ring has a plurality of said grooves disposed circumferentially around the outer surface of the ring and leading radially thereinto, said sleeve having, cooperating therewith, a corresponding number of circumferentially disposed bosses.

19. A release bearing in accordance with claim 18 wherein the cavities of said ring extend all the way through it.

* * * * *